US010186385B2

(12) United States Patent
Toshinari et al.

(10) Patent No.: US 10,186,385 B2
(45) Date of Patent: Jan. 22, 2019

(54) POLARIZABLE ELECTRODE FOR ELECTRIC DOUBLE LAYER CAPACITOR

(71) Applicant: W. L. Gore & Associates, Co., Ltd., Tokyo (JP)

(72) Inventors: Shuhei Toshinari, Tokyo (JP); Hiroyuki Norieda, Tokyo (JP); Kotaro Kobayashi, Tokyo (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 139 days.

(21) Appl. No.: 14/386,857

(22) PCT Filed: Feb. 27, 2013

(86) PCT No.: PCT/JP2013/055217
§ 371 (c)(1),
(2) Date: Sep. 22, 2014

(87) PCT Pub. No.: WO2013/146044
PCT Pub. Date: Oct. 3, 2013

(65) Prior Publication Data
US 2015/0049417 A1 Feb. 19, 2015

(30) Foreign Application Priority Data
Mar. 30, 2012 (JP) .................. 2012-079456

(51) Int. Cl.
*H01G 11/28* (2013.01)
*H01G 11/42* (2013.01)
(Continued)

(52) U.S. Cl.
CPC ............. *H01G 11/42* (2013.01); *H01G 11/04* (2013.01); *H01G 11/28* (2013.01); *H01G 11/38* (2013.01);
(Continued)

(58) Field of Classification Search
CPC ........ H01G 9/058; H01G 9/016; H01G 11/42; H01G 11/28; H01G 11/32; H01G 11/36; H01G 11/68
(Continued)

(56) References Cited

U.S. PATENT DOCUMENTS 6,094,338 A * 7/2000 Hirahara ................ H01G 9/155
29/25.03
8,456,802 B2 * 6/2013 Kobayashi ............. H01G 9/016
361/502
(Continued)

FOREIGN PATENT DOCUMENTS

JP 2000021406 A 1/2000
JP 2002117860 A 4/2002
(Continued)

OTHER PUBLICATIONS

English Translation of International Search Report PCT/JP/2013/055217 dated May 21, 2013.

*Primary Examiner* — Nguyen Ha
(74) *Attorney, Agent, or Firm* — Greenberg Traurig, LLP

(57) ABSTRACT

The present invention provides an electrode for an electric double layer capacitor comprising high energy density, low degradation of electrostatic capacitance and resistance with passage of time even using under high voltage, i.e., excellent long-term reliability. The electrode for the electric double layer capacitor comprises polarizing electrode materials containing porous carbon particles, an auxiliary conducting agent, tungsten oxide powders, and binders; conductive adhesive containing a conductive material and a poly-N-vinylacetamide (PNVA)-based binder; and a sheet current collector.

11 Claims, 4 Drawing Sheets

(51) Int. Cl.
*H01G 11/38* (2013.01)
*H01G 11/04* (2013.01)
*H01G 11/66* (2013.01)
*H01G 11/68* (2013.01)

(52) U.S. Cl.
CPC ............ *H01G 11/66* (2013.01); *H01G 11/68* (2013.01); *Y02E 60/13* (2013.01); *Y02T 10/7022* (2013.01)

(58) Field of Classification Search
USPC ......... 361/502, 503–504, 509, 512, 523–525
See application file for complete search history.

(56) References Cited

U.S. PATENT DOCUMENTS

| | | | |
|---|---|---|---|
| 2006/0079640 A1* | 4/2006 | Ishii | A61K 9/7061 |
| | | | 525/88 |
| 2011/0043966 A1* | 2/2011 | Kobayashi | H01G 9/016 |
| | | | 361/502 |
| 2013/0100583 A1* | 4/2013 | Ito | H01G 9/058 |
| | | | 361/502 |

FOREIGN PATENT DOCUMENTS

| | | | | |
|---|---|---|---|---|
| JP | 2002353074 A | | 12/2002 | |
| JP | 2008-252062 | | 10/2008 | |
| JP | 2009-277783 | | 2/2011 | |
| JP | 2011142049 | * | 7/2011 | ............ H01M 4/48 |
| JP | 2011233845 | * | 11/2011 | ............ H01G 9/058 |
| JP | 2011-233845 | | 4/2013 | |

* cited by examiner

POLARIZABLE ELECTRODE FOR ELECTRIC DOUBLE LAYER CAPACITOR

TECHNICAL FIELD

The present invention relates to an electric double layer capacitor (EDLC) whose polarizing electrode is improved so as to withstand voltage for the purpose of achieving high energy density and long-term reliability.

BACKGROUND ART

Electric double layer capacitors are electricity storage devices using electrostatic capacitance of electric double layers obtained by adsorption/desorption of electrolyte ions at the interfaces between a pair of positive/negative polarizing electrodes and electrolyte solution.

Applications of electric double layer capacitors are widely used from small capacitance devices (such as for memory back), to medium and large capacitance devices (such as for auxiliary power supplies for electric vehicles (EV), solar cells and wind power generations, and for voltage dip compensators). In recent years, for vehicles or construction equipment, further reducing fuel consumption by using regenerative energy has been sought; this is why electric double layer capacitors are considered realizable devices for achieving rapid charge/discharge rates.

Electric double layer capacitors' features to be evaluated are, for example, their electrostatic capacitance (C), working voltage (V), energy density (E), internal resistance, and useful life. For electric double layer capacitors, improvement of each feature is important; however, recently, improvement of their weak point, i.e. energy density, and further extension of their strong point, i.e. useful life (i.e. improvement of the long-term reliability) have been required for the applications of the above mentioned small, medium and large capacitance devices.

Patent Document 1 provides polarizing electrode materials containing a tungsten oxide powder, and an electric double layer capacitor using the materials; the electric double layer capacitor using the polarizing electrode materials has high energy density and low degradation of electrostatic capacitance and resistance with passage of time, i.e. excellent long-term reliability.

In addition, the polarizing electrode materials for the electric double layer capacitor are bonded to a current collector with a conductive adhesive based on water glass.

In Patent Document 1, tungsten oxide contained in the polarizing electrode materials enabled the electric double layer capacitor to have high energy density and low degradation of electrostatic capacitance and resistance with passage of time, i.e. excellent long-term reliability. Although it is not clear why good results were achieved by adding tungsten oxide to the polarizing electrode materials, the following mechanism is considered to exist: Inside an electric double layer capacitor, there is residual water in electrolyte solution, and water that entered the inside upon assembling the electric double layer capacitor. There is also physically adsorbed water or chemically-bonded adsorbed water on the surfaces and inside of activated carbon, an auxiliary conducting agent and a binder used to form the electrode layer, and a separator, etc. This water is separated as water when repeatedly charged and discharged, and electrolyzed by applying voltage to produce gas and OH—, etc. In addition, the water may decompose electrolyte solution; in particular, if the electrolyte solution is organic and fluorine is contained as an electrolyte anion therein, residual water in the electric double layer capacitor reacts with the electrolyte solution to produce hydrofluoric acid (HF), which heavily corrodes the current collectors. Furthermore, these decomposition products may cover the surfaces of the activated carbon or obstruct pores thereof, whereby the surface area thereof become smaller to cause the electrostatic capacitance to be decreased. These decomposition products also raise the resistance by covering openings of the separator. A rise in the internal resistance causes dischargeable energy to be decreased with passage of time. According to Patent Document 1, tungsten oxide contained in the electrode materials adsorb/remove water and decomposition products, whereby pores of porous carbon particles and openings of the separator are thought to be protected from covering.

Patent Document 2 provides a conductive adhesive containing a conductive material and a poly-N-vinylacetamide (PNVA)-based binder for connecting between a polarizing electrode layer and a sheet current collector, which are components of an electrode for an electric double layer capacitor. Thus the conductive adhesive has heat resistance of 250° C. or more for drying to remove water.

Patent Document 2 does not describe that this adhesive may be used as a conductive adhesive connecting between electrode materials containing tungsten oxide and a sheet current collector.

PRIOR ART REFERENCES

Patent Documents

Patent Document 1 Japanese Unexamined Patent Application Publication No. 2011-233845
Patent Document 2 Japanese Unexamined Patent Application Publication No. 2009-277783

DISCLOSURE OF THE INVENTION

Problems to be Solved by the Invention

Electric double layer capacitors with superior long-term reliability have been developed based on above-mentioned Patent Document 1 and 2; however, further improved long-term reliable electric double layer capacitors are required to be developed. In particular, under a severe condition such as a high voltage of more than 3.0 V, degradation of electric double layer capacitors with passage of time (degradation of the electrostatic capacitance and a rise in the internal resistance with passage of time) is apt to be accelerated. That is because further improved long-term reliable electric double layer capacitors usable under a high voltage are being sought.

An object of the invention is to supply an electrode for an electric double layer capacitor which has high energy density and low degradation of electrostatic capacitance and resistance with passage of time when used under a high voltage of 3.0 V or more, i.e. to supply electrodes for excellent long-term reliable electric double layer capacitors.

Means for Solving the Problems

The present inventors intensively studied how to solve the above mentioned problems. As a result they found that one of the reasons why the internal resistance of an electric double layer capacitor was raised with passage of time, when the electric double layer capacitor was used under a high voltage of 3.0 V or more, was defective connection between electrode materials and a current collector. This defective connection was thought to be caused by remarkable corrosion of the current collector/detachment of the electrode induced by HF, OH—, and the like, produced through decomposition of water or electrolyte solution in the electric double layer capacitor. (The extent of the impacts of these phenomena was smaller under conventional working voltages of about 2.5 V to 2.7 V.) As a result, interface resistance between the current collector and the electrode materials was raised.

Moreover, the inventors found that an electrode for an electric double layer capacitor, comprising electrode materials containing tungsten oxide, a conductive adhesive containing a poly-N-vinylacetamide (PNVA)-based binder, and a sheet current collector, may inhibit the corrosion of the current collector/detachment of the electrode materials, because the electrode materials and the sheet current collector are strongly bonded even when used under a high voltage of more than 3.0 V, whereby HF, OH—, and the like, produced through decomposition of water or electrolyte solution do not infiltrate into spaces between the electrode materials and the current collector. As a result, the electrode for the electric double layer capacitor formed herein has high energy density and low degradation of electrostatic capacitance and internal resistance with passage of time even when used under a high voltage more than 3.0 V, i.e. excellent long-term reliability. Although Patent Document 1 described long-term reliability under a high voltage, the invention provides further improved long-term reliability, and especially inhibition of raising internal resistance is remarkably improved.

According to the invention, (1) to (7) hereunder is provided.

(1) An electrode for an electric double layer capacitor comprising polarizing electrode materials including porous carbon particles, an auxiliary conducting agent, a tungsten oxide powder and a binder, a conductive adhesive containing a conductive material and a poly-N-vinylacetamide (PNVA)-based binder, and a sheet current collector.

(2) The electrode for an electric double layer capacitor according to (1), wherein the polarizing electrode materials, the conductive adhesive, and the sheet current collector are laminated in this order.

(3) The electrode for an electric double layer capacitor according to (1) or (2), wherein the poly-N-vinylacetamide (PNVA)-based binder is selected from a group consisting of an N-vinylacetamide homopolymer and an N-vinylacetamide copolymer.

(4) The electrode for an electric double layer capacitor according to (3), wherein the N-vinylacetamide copolymer is a copolymer of a poly-N-vinylacetamide and sodium acrylate.

(5) The electrode for an electric double layer capacitor according to (4), wherein the polymerization ratio between the poly-N-vinylacetamide and sodium acrylate is 9/1 to 5/5.

(6) The electrode for an electric double layer capacitor according to any one of (1) to (5), wherein the conductive material contains a carbon black.

(7) The electrode for an electric double layer capacitor according to any one of (1) to (6), wherein the sheet current collector contains a plain aluminum foil.

Effect of the Invention

According to the invention, by using an electrode for an electric double layer capacitor comprising electrode materials containing tungsten oxide, a conductive adhesive containing a poly-N-vinylacetamide (PNVA)-based binder, and a sheet current collector, the electrode materials and the sheet current collector are strongly bonded, thus HF, OH—, and the like, produced through decomposition of water or electrolyte solution do not infiltrate into spaces between the current collector and the electrode materials. Moreover, the tungsten oxide contained in the electrode materials may adsorb/remove HF, OH—, and the like, which are produced through decomposition of water or electrolyte solution. Therefore, corrosion of the current collector/detachment of the electrode materials may be inhibited, and high energy density and low degradation of electrostatic capacitance and internal resistance with passage of time even when used under a high voltage more than 3.0 V, i.e. excellent long-term reliability, is realized in the electric double layer capacitor. Although Patent Document 1 described long-term reliability under a high voltage, the invention provides further improved long-term reliability, and especially inhibition of raising internal resistance is remarkably improved.

BEST MODE FOR CARRYING OUT THE INVENTION

Figure 1:
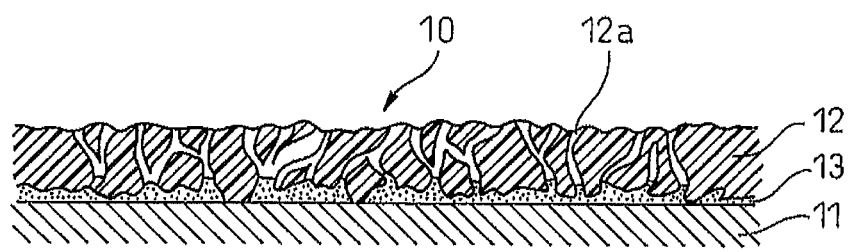
FIG. 1 is an enlarged cross-sectional schematic view showing an example of an electrode for an electric double layer capacitor according to the invention.

An electrode for an electric double layer capacitor according to the invention comprises polarizing electrode materials including porous carbon particles, an auxiliary conducting agent, a tungsten oxide powder and a binder, a conductive adhesive containing a conductive material and a poly-N-vinylacetamide (PNVA)-based binder, and a sheet current collector.

Each element constituting the electrode for an electric double layer capacitor according to the invention is described below.

The porous carbon particles contained in the polarizing electrode materials are not especially specified only if they are carbonaceous materials that may form electric double layers; for example, activated carbon and the like may be used. Activated carbon may be used if the specific surface area calculated by Brunauer, Emmet and Teller's equation (BET equation) is 500 $m^2/g$ or more, preferably 1,000 $m^2/g$ more, and 3,000 $m^2g$ or less, preferably 2,500 $m^2/g$ or less. Raw materials of activated carbon are not especially specified. Concrete examples of useable materials include vegetable matters such as woods, coconut shells and pulp waste liquor, fossil fuels such as coal and petroleum heavy oil, pyrolysis products of fossil fuels such as coal-based pitch, oil-based pitch and coke, and synthetic resins such as phenolic resin, furan resin, polyvinyl chloride resin and polyvinyl-vinylidene chloride resin.

For carbon activation method, various methods, such as gas activation or chemical activation can be applied. Gas used for gas activation may be such as steam, carbon dioxide, oxygen, chlorine, sulfur dioxide, and sulfur vapor. For chemical activation, zinc chloride, potassium hydroxide, sodium hydroxide, potassium carbonate, sodium carbonate, phosphoric acid, calcium chloride, potassium sulfide and the like can be used For grinding activated carbon, various mills, such as ball, jet, and hammer mills, can be used. If the target particle size can not be achieved by grinding, the particle size can be adjusted by classification.

Also, microcrystalline carbon similar to graphite that is manufactured by activating carbon material may be used as the porous carbon. This microcrystalline carbon forms an electric double layer by allowing ions and the like to enter into crystalline layers when applying voltage, and can be obtained, for example, in accordance with the technique described in the Japanese Unexamined Patent Application Publication No. 11-317333.

Auxiliary conducting agents contained in the polarizing electrode materials are highly conductive graphite, wherein vapor phase thermal decomposition is applied to graphite comprising high conductivity achieved by existence of delocalized n-electron; carbon blacks, spherical aggregates forming turbulent layer structure accumulated graphite microcrystalline carbon layers (such as acetylene black, KetjenBlack, and other furnace black, channel black, thermal black); hydrocarbons such as methane, propane and acetylene, and then precipitated as a thin film on the graphite forming a substrate. Synthetic graphite, especially highly purified synthetic graphite is preferable due to its low content of metallic impurities and its secured high conductivity, and KetjenBlack acetylene black is also preferable due to its relatively small diameter and relatively good conductivity. High purity herein means that ash is contained by 0.5 mass % or less.

The mixing ratio of the auxiliary conducting agent is preferably 10 parts by weight or less, respect to 100 parts by weight of the main components of polarizing electrode materials, which are a total mass of porous carbon particles, the auxiliary conducting agent, and binder. The total mass is a dry mass after removing a forming agent used for mixing their main components. The auxiliary conducting agent is used for reducing contact resistance between porous carbon particles, and it was typically by 10 parts by weight or more with a conventional polarizing electrode layer (unless otherwise specified, electrode layer herein means a layer comprising electrode materials, or a layer made of a combination of electrode materials and conductive adhesive, and does not include a current collector). Nevertheless, the more the amount of the auxiliary conducting agent, the worse the workability of polarizing electrode layer gets, causing problems such as crazing, cracking, and deterioration of rolling. Moreover, the size of powders are smaller compared to activated carbon, filling the voids between particles of polarizing electrode layer, preventing electrolyte solution from being diffused, if the particles are not uniformly dispersed.

High energy density, low degradation of electrostatic capacitance and resistance with passage of time, i.e., excellent long-term reliability is realized for polarizing electrode materials because of tungsten oxide powders contained therein. Although it is not clear why good result may be achieved by containing tungsten oxide powders, it is considered that water and decomposition products are adsorbed and removed, whereby porous carbon particles and openings of the separator are protected from covering.

The mixing ratio of additive amount of tungsten oxide powders, is preferably of 2-40 parts by weight, and more preferably 4-30 parts by weight, respect to 100 parts by weight of the main components of polarizing electrode materials which are a total mass of porous carbon particles, an auxiliary conducting agent, and binders (the total mass is a dry mass after removing forming agent used for mixing their main components). In the case of the mixing ratio of the additive amount is less than 2 parts by weight, the effect of adsorption and removal of water and decomposition products are insufficient. On the other hand, the more the mixing ratio of the additive amount of tungsten oxide powders is increased, the more the ratio of porous carbon particles per volume of electrode materials is decreased to cause reducing starting amount of electrostatic capacitance of a capacitor cell. When the mixing ratio of the additive amount of tungsten oxide powders is 4-30 parts by weight, the effect of adsorption and removal of water and decomposition products is remarkable as well as the starting amount of electrostatic capacitance is secured, thus this mixing ratio is more preferable.

Any range of particle sizes may be applied for tungsten oxide powders only if they do not affect the thickness of an electrode layer in the case of forming the electrode layer for an electric double layer capacitor. In fact, particle size of tungsten oxide powders is preferably approximately from 0.1 μm to 50 μm, whereby the thickness of the electrode layer is not affected, and expenses are lower for grinding and classification process.

Several tens μm of tungsten oxide powders are generally commercially available. Smaller sized powders need further grinding and classification process. The smaller the powder size needs to be, the longer grinding time is needed, worsening yield and raising the expenditure required. Therefore, approximately 0.1 μm is thought to be the industrially applicable smallest size. The thickness of the electrode for the electric double layer capacitor is normally approximately in a range of 0.01 mm to 5 mm. Particle size of additive tungsten oxide powders needs to be suppressed smaller than the thickness of the electrode layer, and approximately up to 30 μm is thought to be the largest particle size, considering the size of commercially available tungsten oxide powders.

For grinding tungsten oxide powders various mills, such as ball, jet, and hammer mills, may be used, like grinding activated carbon. If the target particle size is not achieved by grinding, particle size may be adjusted by classification. Moreover, for the mixing method of tungsten oxide and porous carbon particles, there is no limit on the mixing method to uniformly disperse them. For example, a method to blend tungsten oxide and porous carbon particles both in the solid state can be used, or one can also make slurry of at least one of them, dispersing it in water, organic solution, and the like. Moreover, ultrasonic mixing or water current can be used to mix tungsten oxide and porous carbon particles, in order to improve the degree of dispersion.

The binder contained in the polarizing electrode materials bonds porous particles, an auxiliary conducting agent, and tungsten oxide powders contained in the polarizing electrode materials.

For the binder, polytetrafluoroethylene (PTFE), polyvinylidene fluoride (PVDF), polyethylene (PE), polypropylene (PP), styrene-butadiene rubber (SBR), acrylonitrile-butadiene rubber (NBR), and the like can be used.

The mixing ratio of the binders is preferably in a range of 1-30 parts by weight, more preferably in a range of 3-20 parts by weight, respect to 100 parts by weight of the main components of the polarizing electrode materials which are a total mass of porous carbon particles, an auxiliary conducting agent, and the binder. The total mass is a dry mass after removing a forming agent used for mixing their main components. In a case that the mixing ratio of the binders is less than 1 part by weight, it becomes difficult to retain porous carbon particle in the polarizing electrode materials. On the other hand, if the mixing ratio of the binder is more than 30 parts by weight, the energy density of an electric double layer capacitor becomes low and the internal resistance is raised.

A polarizing electrode layer that has the target uniform size and porosity can be formed by adding and mixing a forming agent (i.e., water, alcohols such as methanol, ethanol, and the like, oils such as petroleum, or other type of oils) to each component of polarizing electrode materials (i.e., porous carbon particles that are materials of electric double layers, an auxiliary conducting agent securing conductivity, and a binder that bonds them) as necessary, and rolling, extruding, or coating them to make a sheet form, and then removing the forming agent from the resulting form. If ethanol is used as the forming agent, for example, the above mentioned polarizing electrode layer can be obtained by rolling extrusion at the temperature in a range from 50 to 100° C., and in a rage of the mixing ratio of 3-15 parts by weight of carbon material, 5-15 parts by weight of bonding agent, 50-300 parts by weight of ethanol, respect to 100 parts by weight of electric double layer forming material. The polarizing electrode layer may be produced by mixing a conductive additive with each component of polarizing electrode materials, case by case.

The average pore size of the polarizing electrode layer is preferably 0.1 μm to 5 μm, or, more preferably 0.5 μm to 3 μm. If the pore size falls below the average, conductive adhesive sometime tend to be difficult to penetrate into pores of the polarizing electrode layer. On the other hand, if the pore size exceeds the average, the conductive adhesive penetrates deeply into pores of the polarizing electrode layer to cause decreasing adhesiveness by dramatically reducing the conductive adhesive remained on the interfaces between a current collector and the polarizing electrode layer. Moreover, if the porous carbon particles of the polarizing electrode layer are configured with activated carbon, the pores of the activated carbon would be covered with component of the conductive adhesive, as a result, a risk of reduction of capacitor performance might to be produced. The average pore size mentioned in the specification is a value obtained by Mercury Intrusion Porosimetry (by Micrometrics, Inc. "Pore Sizer 9310").

The porosity of the polarizing electrode layer is preferably in a range of 40% to 90%, more preferably in a range of 60% to 80%. If the porosity falls below the above mentioned range, there is a possibility that sufficient amount of electrolyte solution required cannot be retained in case of capacitor, resulting in higher internal resistance. In addition, as it will reduce the amount of conductive adhesive penetrable into pores of the polarizing electrode layer, anchor effect or internal resistance reduction effect might not be secured sufficiently. On the other hand, if the porosity exceeds the above mentioned range, in a case that there is no enough conductive adhesive, conductive adhesive does not penetrate into enough pores, and causes insufficient anchor effect. Also, pores will remain as voids (becomes liquid phase as electrolyte solution is injected, if used for a capacitor), which might not reduce internal resistance sufficiently.

On the contrary, if the amount of conductive adhesive is excessive, the conductive adhesive penetrates deeply into pores of the polarizing electrode layer. In a case which the activated carbon is used for the polarizing electrode layer, the majority of pores of the activated carbon will be covered with the adhesive, resulting in smaller specific surface of the activated carbon, which might cause capacitor's performance reduction.

In the specification, porosity (%) herein means a calculated value, that is a ratio of pore volume (Vo) against all volume of the polarizing electrode layer (V), i.e., [(Vo/V)× 100]. The ratio of pore volume is obtained by an equation below by measuring density (ρ) of the polarizing electrode layer and weight (W) thereof.

$$Vo = V - (W/\rho)$$

The porosity and average pore size of the polarizing electrode layer can be adjusted, depending on a type of electric double layer which are materials of the polarizing electrode layer, the amount of binder, and the rolling pressure when producing the polarizing electrode layer, and the like. Moreover, the thickness of the polarizing electrode layer is typically in a range of 0.05 mm to 1 mm, however, a range of 0.08 mm to 0.5 mm is more preferable.

A poly-N-vinylacetamide (PNVA)-based binder contained in a conductive adhesive is shown in a chemical formula (1):

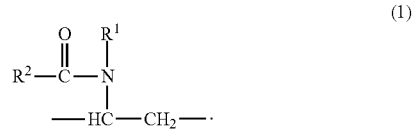

(wherein $R^1$ and $R^2$ each independently represent hydrogen or a C1-10 and preferably a C1-6 alkyl group, with an ether bond, ester bond, thioether bond or amide bond optionally present in the alkyl group chain.) The above mentioned amide structure comprised polymer containing repetitive structure units are preferable. $R^1$ and $R^2$ are preferably hydrogen or methyl, ethyl, propyl, isopropyl, butyl, 2-methylpropyl, t-butyl or methoxymethyl groups, and more preferably $R^1$ is hydrogen and $R^2$ is a methyl or ethyl group.

Furthermore, amide structure comprised polymer containing repetitive structure units is shown by a chemical formula (2) below.

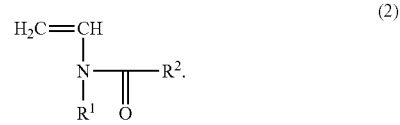

(wherein $R^1$ and $R^2$ each independently represent hydrogen or a C1-10 alkyl group and preferably a C1-6 alkyl group, with an ether bond, ester bond, thioether bond or amide bond optionally present in the alkyl group chain.), and polymers obtained by polymerizing such compounds may be suitably used. $R^1$ and $R^2$ are preferably hydrogen or methyl, ethyl, propyl, isopropyl, butyl, 2-methylpropyl, t-butyl or methoxymethyl groups, and more preferably $R^1$ is hydrogen and $R^2$ is a methyl or ethyl group.

An N-vinylacetamide polymer (a compound of formula (2) wherein $R^1$=H, $R^2$=$CH_s$), is preferably used because it can stably absorb aqueous solution regardless of acidic or alkali pH (the hydrogen ion concentration).

A poly-N-vinylacetamide-based binder has high heat resistance, as well as a high coating property and high dispersibility. Due to its high coating property, adhesion to a current collector tends to be face adhesion instead of point adhesion, resulting in uniform adhesion between an electrode material layer and the current collector. Therefore, there are no void to contain water and decomposition products (such as OH— and HF) between the current collector and the electrode material layer, and corrosion of the current collector/detachment between the electrode material layer and the current collector may be inhibited. In particular, as for the sheet current collector with smooth surfaces such as a plain aluminum foil, sufficient adhesiveness and resulting long-term durability may be maintained. Furthermore, because of its high dispersibility, a conductive material may be uniformly dispersed in a conductive adhesive; thus the conductivity of the conductive adhesive may be improved to cause a low resistance.

In the invention, N-vinylacetamide binders are N-vinylacetamide homopolymers and N-vinylacetamide copolymers. Monomers copolymerizable with N-vinylacetamide are, for example, (meth)acrylic acid-based monomers such as (meth)acrylic acid and its salts including sodium acrylate, methyl(meth)acrylate, ethyl(meth)acrylate, (iso)propyl (meth)acrylate, butyl(meth)acrylate, octyl(meth)acrylate, 2-ethylhexyl(meth)acrylate, methoxyethyl(meth)acrylate, 2-hydroxyethyl(meth)acrylate, 2-hydroxypropyl(meth)acrylate and polyoxyalkylene glycol mono(meth)acrylate; (meth)acrylamide-based monomers such as (meth)acrylamide, N,N-dimethyl(meth)acrylamide, N,N-diethyl(meth)acrylamide, N-methylol(meth)acrylamide, 2-(meth)acrylamide-2-methylpropanesulfonic acid and its salts, and N-isopropyl(meth)acrylamide; vinyl ester-based monomers such as vinyl acetate, vinyl butyrate and vinyl valerate; styrene-based monomers such as styrene, α-methylstyrene, p-methylstyrene, p-methoxystyrene and m-chlorostyrene; vinyl ether-based monomers such as methyl vinyl ether, butyl vinyl ether and vinyl benzyl ether; dicarboxylic acid-based monomers such as maleic anhydride, maleic acid and its salts, fumaric acid and its salts, maleic acid dimethyl ester and fumaric acid dimethyl ester; and allyl-based monomers such as allyl alcohol, allyl phenyl ether and allyl acetate, as well as monomers such as (meth)acrylonitrile, vinyl chloride, ethylene and propylene. Two or more of the monomers mentioned above may also be copolymerized in combination.

By forming an N-vinylacetamide copolymer, properties of a copolymerized monomer may be added to basic properties of N-vinylacetamide (heat resistance, coating property, dispersibility). Among N-vinylacetamide copolymers, a copolymer of a poly-N-vinylacetamide and sodium acrylate is preferable since swelling resistance to electrolyte solution (solvent) may be improved thereby. If adhered sections are entirely swelled, the adhesiveness between the electrode material layer and the current collector is generally decreased, and then detachment is easily to be produced. Since detached sections do not become conducting paths, the internal resistance is consequently raised. If the electrolyte solution partly permeates the adhered sections and only parts of them are swelled, voids may be produced due to differences in swelling from adjacent adhered sections, thus conductive paths may be reduced. Furthermore, water or decomposed products (such as OH— and HF) may infiltrate into the voids to accelerate the corrosion of the current collector, resulting in a rise in the internal resistance. Copolymer of a poly-N-vinylacetamide and sodium acrylate has high swelling resistance to the electrolyte solution (solvent), and detachment between the electrode material layer and the current collector may thus be inhibited.

The proportions in which these copolymerizable monomers are used are levels that do not impair the desired performance of the invention, and they are generally no greater than 60 mass %, preferably no greater than 50 mass %, more preferably 40 mass %, and even more preferably no greater than 30 mass %, with respect to the total quantity of polymerizable monomers.

The polymerization ratio between apoly-N-vinylacetamide and sodium acrylate is preferably 9/1 to 5/5. The more the contained amount of the sodium acrylate is increased, the more the swelling resistance to the electrolyte solution (solvent) and adhesiveness due to the swelling resistance are improved; at the same time, however, the amount of the poly-N-vinylacetamide contained is reduced to cause decreases in the heat resistance, dispersibility, and coating property.

For applications in electric double layer capacitors, balances between durability (due to adhesiveness) and processability (due to dispersibility and coating property) are considered, and the polymerization ratio is preferably provided within the above mentioned range.

In the invention, if an N-vinylacetamide polymer is a three-dimensionally cross-linked polymer containing a three-dimensionally cross-linked structure, the N-vinylacetamide polymer is manufactured by cross-linking polymerization of N-vinylacetamide, with above mentioned other comonomers as necessary, in the presence of a cross-linking agent comprising two or more polymerizable double bonds in one molecule, or by a method wherein a non-cross-linked precursor polymer is previously manufactured to react with functional groups in the polymer to form chemical bonds, for example, cross-linking with radiation or a peroxide.

Any kind of publicly known cross-linking agents that have two or more polymerizable double bonds in one molecule may be used here for cross-linking. Such agents are, for example, polyallyl ether derived from the following compounds comprising two or more hydroxyl groups in each one molecule: tetraallyloxyethane, pentaerythritol tetraallyl ether, pentaerythritol triallyl ether, trimethylolpropane triallyl ether, ethylene glycol diallyl ether, diethylene glycol diallyl ether, triethylene glycol diallyl ether, diallyl ether, monosaccharides, disaccharides, polysaccharides, cellulose, and the like; polyallyl ester derived from the following compounds comprising two or more carboxyl groups in each one molecule: triallyl trimellitate, triallyl citrate, diallyl oxalate, diallyl succinate, diallyl adipate, diallyl maleate, and the like; compounds comprising two or more allyl groups in each one molecule, such as diallylamine and triallyl isocyanurate; compounds comprising two or more vinyl ester structures in each one molecule, such as divinyl oxalate, divinyl malonate, divinyl succinate, divinyl glutarate, divinyl adipate, divinyl maleate, divinyl fumarate and trivinyl citrate; bis(N-vinylcarboxylic acid amide) compounds, such as N,N'-butylenebis(N-vinylacetamide) and N,N'-diacetyl-N,N'-divinyl-1,4-bisaminomethylcyclohexane; compounds comprising multiple acrylamide structures or (meth)acrylic groups, such as N,N'-methylenebisacrylamide, ethylene glycol di(meth)acrylate, diethylene glycol di(meth)acrylate, polyethylene glycol di(meth)acrylate, trimethylopropane tri(meth)acrylate and pentaerythritol tri(meth)acrylate; divinylbenzene, divinyl ether and allyl (meth)acrylate. These cross-linking agents may be used alone, or two or more of the cross-linking agents may be combined to use.

The amount of above cross-linking agent used is preferably no greater than 10 mass % and more preferably no greater than 6 mass % with respect to the total amount of polymerizable monomers including N-vinylacetamide.

Cross-linking agents reacted with functional groups in a non-cross-linked precursor polymer (such as hydroxyl groups, amino groups, carboxyl groups) to form chemical bond are, depending on the functional groups, polyglycidyl ether, polyisocyanurate, polyamine, polyol, polycarboxylic acid, and the like. Regarding the amount of these cross-linking agents used, the weight ratio between the polymer and a cross-linking agent is preferably in the range of 90:10 to 99.999:0.001, more preferably 95:5 to 99.995:0.005, based on the total amount of a normal non-cross-linked precursor polymer.

The molecular weight of the N-vinylacetamide polymer, as the weight-average molecular weight, is preferably 5,000 or more, more preferably 5,000 to 10,000,000, even more preferably 30,000 to 10,000,000, and particularly preferably 100,000 to 5,000,000. Too small molecular weight is not preferable since the heat-resistant adhesiveness is decreased and the mechanical strength is also reduced. On the other hand, too large molecular weight is not also preferable since the liquid viscosity of the formed conductive adhesive becomes exceedingly high.

Specific examples of N-vinylacetamide polymers for the invention include poly-N-vinylacetamides (by Showa Denko K.K.), such as the cross-linked types NA-150F, NA-010F and NA-010S, the non-cross-linked types GE-191, GE-191LH, GE-191L, GE-191LL and GE-191L34, and GE-167 (sodium acrylate copolymer), GE-167L, GE-163LM, and XGC-330 (vinyl acetate copolymer), and XGC-265 (acrylamide copolymer).

The conductive material contained in the conductive adhesive may be the same material as the auxiliary conducting agent contained in the polarizing electrode materials, including graphite, which has high conductivity due to the presence of delocalized π-electrons; carbon blacks, which are spherical aggregates having several layers of graphite carbon microcrystals collected to form a turbostratic structure (such as acetylene black, Ketjenblack, other furnace blacks, channel black, thermal lamp black); and pyrolytic graphite, which is produced by thermally decomposing a hydrocarbon such as methane, propane or acetylene in a gas phase and then depositing it as a thin film on a graphite substrate. Carbon blacks are preferable because of their relatively small particle sizes and relatively good conductivity. Synthetic graphite, especially highly purified synthetic graphite, is also preferable because it has a low content of metallic impurities and ensures high conductivity. "High purity" herein means an ash content of 0.5 mass % or lower.

Although the conductive material contained in the conductive adhesive may be the same material as the auxiliary conducting agent contained in the polarizing electrode materials, in the specification, to avoid confusion of terms used herein, a material contained in the polarizing electrode is designated as an "auxiliary conducting agent", and a material contained in the conductive adhesive is designated as a "conductive material", unless otherwise specified.

The conductive material is preferably a combination of two or more materials with different particle sizes, in order to facilitate both low internal resistance and heat-resistant adhesiveness of the conductive adhesive. For example, a mixture of highly purified synthetic graphite powder and acetylene black may be suitably used.

The conductive material will now be explained for a case using a carbon black such as acetylene black and highly purified synthetic graphite. The average particle size (primary particle diameter) of acetylene black is normally approximately 10 nm to 50 nm. The average particle size of highly purified synthetic graphite used is preferably 0.5 μm to 20 μm, and more preferably 1 μm to 10 μm. If the conductive adhesive contains the conductive material that is a mixture of highly purified synthetic graphite and acetylene black having these average particle sizes, the conductivity of the conductive adhesive itself is increased, while a part of the conductive adhesive penetrates into pores of the polarizing electrode material layer, causing so called anchor effect, then excellent adhesive strength and an internal resistance reduction effect may be secured.

Using a mixture of a carbon black, such as acetylene black, and highly purified synthetic graphite as a conductive material as above may be confirmed from a diffraction intensity curve for a section of the electrode, especially of the conductive adhesive part, obtained by X-ray diffraction, wherein a crystalline diffraction line profile based on synthetic graphite and an amorphous diffraction line profile based on the carbon black are observed.

The mixing ratio of acetylene black and highly purified synthetic graphite is preferably 1:10 to 1:1, more preferably 1:3 to 1:1, in terms of weight ratio. Sufficient adhesiveness and a high internal resistance reduction effect may be simultaneously secured by such a mixing ratio.

The average particle size of highly purified synthetic graphite mentioned here is a value obtained by laser diffraction particle size analyzer (by Shimadzu Corporation "SALD-2000"). In addition, in the case of acetylene black whose average particle diameter is within the above mentioned range, acetylene black may be selected by nominal values of each manufacture thereof.

In these conductive materials, regardless of their types, the amount of ash contained is desirably 0.5% or less. In the case of applying electrode which uses a carbon material containing such a small amount of ash to the electric double layer capacitor, the life of the capacitor may be extended.

The entire amount of the conductive material contained in the above mentioned conductive adhesive is preferably 3 mass % to 30 mass %, more preferably 5 mass % to 15 mass %. If the amount of conductive material falls under the above mentioned range, conductivity of conductive adhesive might become insufficient. On the other hand, if the amount of conductive material exceeds the above mentioned range, amount balance with binder (poly-N-vinylacetamide (PNVA)-based binder) for forming conductive adhesive is broken, adhesiveness thus tends to be decreased.

The amount of a poly-N-vinylacetamide (PNVA)-based binder contained in conductive adhesive is preferably 15 mass % or less, more preferably 10 mass % or less. If the amount of poly-N-vinylacetamide (PNVA)-based binder exceeds the above mentioned range, internal resistance might be exceedingly increased. In an aspect of securing a sufficient adhesiveness of conductive adhesive, the amount of the poly-N-vinylacetamide (PNVA)-based binder contained in conductive adhesive is preferably 0.5 mass % or more, more preferably 2 mass % or more.

The conductive adhesive in the invention uses two or more types of conductive materials having different particle sizes, therefore the conductive adhesive can obtain conductive materials which have small sized particles (i.e., carbon blacks such as acetylene black) favorably filtrating into pores in the polarizing electrode layer and also have conductive materials having large sized particles (such as highly purified synthetic graphite). As a conductive adhesive with high conductivity can therefore be formed while the amount of conductive materials with a small particle size is reduced, it is possible to prevent the particle surfaces of the poly-N-vinylacetamide-based binder in the dispersion medium from being covered by small particles of the conductive materials, securing highly heat-resistant adhesiveness in the form of conductive adhesive.

While metal materials such as aluminum, titanium, tantalum, nickel, iron, stainless, and copper may be used for a sheet current collector, a component of the electrode for the electric double layer capacitor, aluminum is preferably used for its excellent conductivity and stability (aluminum does not dissolve or is not precipitated in electrolyte solution), and its excellent cost performance. These metals can be used in any of the forms of foil, plate, and sheet.

The surface of a sheet current collector may be roughened by a roughening treatment, or may be flat and smooth such as a plain aluminum foil. When the surface of a sheet current collector is roughened, the method used therefor is not limited, and publicly known methods such as sand blasting, etching (electrolytic etching, chemical etching, and the like) may be used. Particularly, chemical etching using chemicals is preferable because it can easily control the form of pores or roughness formed on the sheet current collector into ones that are suitable for providing anchor effect of the adhesive. Roughness formed on the surface can easily induce the anchor effect of the adhesive, thus advantages of increased adhesiveness and lower resistance are provided. On the other hand, for a sheet current collector whose surface is flat and smooth such as a plain aluminum foil, roughening treatment is not needed, thus cost effective. According to the invention, when a sheet current collector is made from a plain aluminum foil, even if voids exist by point contacts between the sheet current collector and polarizing electrode materials, those voids are filled by conductive adhesive (voids are vanished), and the conductive adhesive may infiltrate into pores of the electric polarizing electrode materials, whereby a sufficient adhesiveness can be sustained.

According to the invention, even if the sheet current collector includes a plain aluminum foil, sufficient adhesiveness, and long-term durability, due to its sufficient adhesiveness, can be sustained, and thus cost effectiveness can be achieved.

The thickness of the current collector (when roughening treatment is performed, the thickness before the treatment) is generally 10 µm to 100 µm, preferably 20 µm to 50 µm.

By using each of the above-mentioned element of components, the electrode for the electric double layer capacitor of the invention can be manufactured. The electrode for the electric double layer capacitor of the invention comprises an electrode material containing tungsten oxide, the conductive adhesive containing a poly-N-vinylacetamide (PNVA)-based binder, and a sheet current collector. The poly-N-vinylacetamide (PNVA)-based binder comptained therein can strongly adhere the electrode materials and the sheet current collector under high voltage, preventing detachment of the electrode materials, therefore corrosion of the current collector can be inhibited by blocking penetration of HF, OH— and the like, produced from decomposition of water or electrolyte solution. Even if HF, OH—, and the like, happen to approach the current collector, the HF, OH—, and the like will be adsorbed/removed by tungsten oxide to inhibit reaction of the current collector therewith, thereby corrosion of the current collector can be further inhibited. Minimized corrosion may lead to inhibition of detachment of electrode the materials, thus low resistance of the electric double layer capacitor can be sustained for a long time. Therefore, by the invention, the electric double layer capacitor is obtained, wherein corrosion of the current collector and detachment of the electrode materials are inhibited, and high energy density even under high voltage and less electrostatic capacitance and internal resistance degradation over time, i.e., long-term reliability are realized.

The polarizing electrode materials can be manufactured into layers to form polarizing electrode layers by a sheeting method, a coating method, and the like. As for the sheeting method, an electrode material sheet (electrode layer) may be previously formed, then adhered to a sheet current collector via conductive adhesive. Instead, the electrode materials and the conductive adhesive may be mixed to form a sheet (electrode layer), then adhered to the sheet current collector. The coating method is a method to form an electrode layer by coating polarizing electrode materials on the current collector. In the coating method, the current collector may be coated by the current adhesive, and then coated by the polarizing electrode materials. Instead, the conductive adhesive and polarizing electrode materials may be mixed to coat the current collector.

In the case of the sheeting method, for example, a sheet can be made by adjusting the particle sizes of the porous carbon particles obtained by the aforementioned method so that the average particle size D5 becomes approximately 5 µm to 200 µm, kneading the resulting porous carbon particles with an auxiliary conducting agent, tungsten oxide powder, and binders and rolling down the mixture. For kneading, a liquid auxiliary agent such as water, ethanol, and acetonitrile may be used alone or a mixture of the aforementioned liquid auxiliaries may be used as necessary. When a same activated carbon is used as porous carbon particles for the polarizing electrode materials, the sheeting method can provide high capacitance as the sheeting method can more uniformly consolidate the activated carbon than the coating method can, thanks to the roll-down process.

In the case of the coating method, a coating liquid may be formed by mixing, using an agitator, a mixture containing porous carbon particles, an auxiliary conductive agent and tungsten oxide, and the conductive adhesive by a mixture, and also a dispersion medium (such as water, ethanol) as necessary. Using a roll coater, the coating liquid may be coated on the current collector, then the coated current collector is put in the oven to vaporize/remove the dispersion medium from the coating liquid layer to obtain the polarizing current layer.

The conductive adhesive is coated on the surface (interface) of a sheet current collector and/or a polarizing electrode layer. The coated surface may be one of the interfaces of the sheet current collector and the polarizing electrode layer, or both the interfaces. The coating amount of the conductive adhesive is preferably 2 $g/m^2$ to 15 $g/m^2$ after drying (i.e., the amount of component contained in the conductive adhesive), more preferably 2 $g/m^2$ to 10 $g/m^2$.

The polarizing electrode materials, the conductive adhesive, and the sheet current collector may be laminated in the order mentioned. The polarizing electrode materials and the sheet current collector are laminated in a way that the conductive adhesive exists therebetween. The aforementioned components may only be placed on top of each other, but it is preferable to pressurize and compress after those components placed on top of each other. The latter method further enhances bonding and ensures that part of the adhesiveness is injected into pores in the polarizing electrode layer. Furthermore, as the polarizing electrode layer is pressurized to achieve high density, the polarizing electrode layer can have high capacitance. Although a pressurizing method is not especially specified, a method of using a pair of pressure rolls is a relatively simple and easy example. In this case, clearance between rolls against entire thickness of laminated layers is, for example, preferably 30% to 90%, more preferably 50% to 70%. By setting the clearance to these ranges, the polarizing electrode layer will have high capacitance. If the clearance falls under the above mentioned range, there is a risk of deformation of the current collector, and detachment of the polarizing electrode layer due to the deformation.

In the case of laminating polarizing electrode materials with a sheet current collector so as to have the conductive adhesive exist therebetween, the increase of the internal resistance will be suppressed more than the case of mixing the polarizing electrode materials with the conductive adhesive and bonding the mixture onto the sheet current collector. Although the reason is not limited to a specific theory, if tungsten oxide contained in the polarizing electrode materials directly contacts with the sheet current collector, the tungsten oxide may accelerate the corrosion reaction of the current collector as a catalyst.

After combining the polarizing electrode materials, the conductive adhesive, with the sheet current collector, volatile constituent (such as dispersion medium) in the conductive adhesive may be removed, if contained therein. The removing method is not especially specified, however, induction heating, far infrared heating, heated air drying methods are suitable examples. Drying temperature is preferably approximately around the boiling point of the dispersion medium. After removing the dispersion medium, as examples of an electrode for an electric double layer capacitor of the invention, the electrode for the electric double layer capacitor is obtained as shown in FIG. 1. In FIG. 1, the electrode 10 is adhered to polarizing electrode material layers 12, on the upper surface of current collector 11, via conductive additive layer 13. The polarizing electrode material layer 12 has a configuration contained porous carbon particles that is a forming material of electric conductive layer, an auxiliary conducting agent that is securing conductivity, tungsten oxide, and binders. As shown in FIG. 1, the polarizing electrode material layer 12 is porous material comprised with above mentioned configuration. A part of conductive adhesive layer 13 is penetrated into the pores 12a.

EXAMPLES

The invention will now be described in more detail by way of examples. However, examples described below do not restrict the invention, various modifications or variations can be made without departing from the spirit and scope of the invention described above and below, and the invention also intends to contain the various modifications and variations if they fall within the spirit and scope of the invention and equivalent technologies.

<Forming Electric Double Layer Capacitor>

Electric double layer capacitors used as examples of the invention and comparative examples were formed as follows.

[Polarizing electrode materials]

Ethanol 30 parts by weight was add to a mixture containing steam activated coconut shell activated carbon 80 parts by weight (by KURARAY CHEMICAL CO., LTD. "YP-50F") whose specific surface calculated by Brunauer, Emmet and Teller's equation (BET equation) is approximately 1700 $m^2/g$ as porous carbon particles, acetylene black powders as an auxiliary conducting agent 10 parts by weight (by DENKI KAGAKU KOGYO KABUSHIKI KAISHA "DENKA BLACK Powder Products"), polytetrafluoroethylene powders as a binder 10 parts by weight (by Du Pont-Mitsui Fluorochemicals Co., Ltd. "Teflon® 6J"), tungsten trioxide 10 parts by weight with an average particle size of 30 μm (by KANTO CHEMICAL CO., INC. "Cica I" (C stands for Chemicals, I for Industrial Products, C for Collect, and A for Associate)), and knead therewith, and then processed paste extrusion thereof to form tapes. After that, the tapes were rolled three times to form sheets, and then dried for one hour at the temperature of 150° C. to remove ethanol therefrom, thereby a polarizing electrode material sheet with a width of 100 mm and thickness of 150 μm was obtained.

[Conductive Adhesive]

For conductive material, highly purified synthetic graphite with an average particle size of 8 μm (by Nippon Graphite Industries, ltd. "SP-270"), and acetylene black with an average particle size (primary particle diameter) of 35 nm (by DENKI KAGAKU KOGYO KABUSHIKI KAISHA "DENKA BLACK") were used. Furthermore, conductive adhesive were obtained by using poly-N-vinylacetamide (by Showa Denko K.K. "PNVA GE191-203"), or sodium acrylate copolymer (by Showa Denko K.K. "PNVA GE167-103") as a poly-N-vinylacetamide (PNVA)-based binder. As for comparative examples, instead of PNVA, synthetic rubber SBR (styrene-butadiene rubber) was used.

[Current Collectors]

For current collectors, plain aluminum foils with a width of 150 mm and a thickness of 30 μm (by Nippon Foil Mfg. Co., Ltd. "A1N30H-H18") were used.

[Forming Electrodes]

Figure 2:
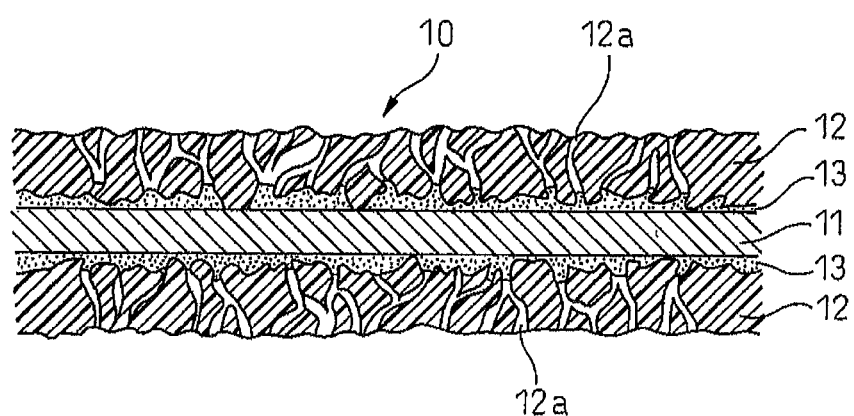
FIG. 2 is an enlarged cross-sectional schematic view showing an example of an electrode for an electric double layer capacitor (electrode layers adhered on both surfaces of a current corrector) according to the invention.
Figure 3:
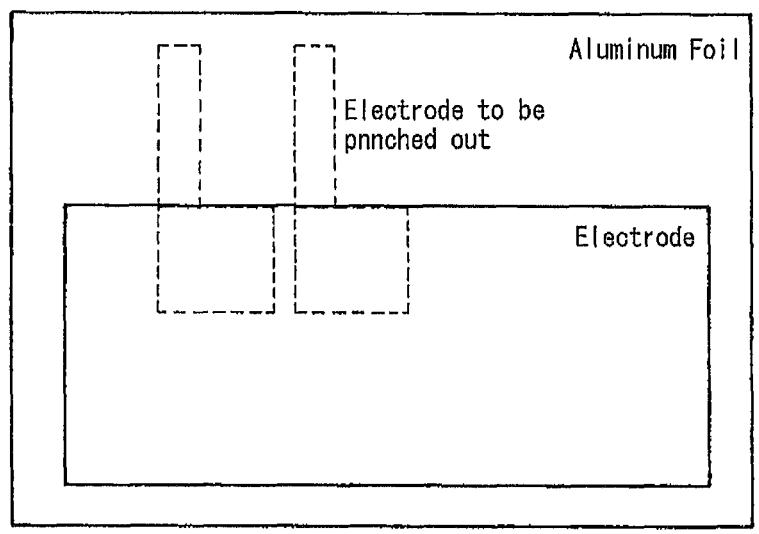
FIG. 3 is a simplified view showing a method for punching out the electrodes formed in the examples of the invention and comparative examples.

Both surfaces of a current collector were coated by conductive adhesive using coating rolls. The coating amount on each surface was 12 $g/m^2$ (approximately 2 $g/m^2$ after drying). After coating, a long polarizing electrode layers were laminated on both surfaces (where conductive adhesive were coated) of the current collector, and then passed through pressure rolls (clearance between rolls is 70%) to form a laminated sheet. The laminated sheet was passed through a dryer at a set temperature of 150° C. for three minutes to remove dispersion medium from the conductive adhesive, and then obtained a long electrode as shown in FIG. 2. The laminated sheet was then punched out so as to form like square shaped polarizing electrodes, wherein the laminated parts of polarizing electrode material sheet were 3 cm square, and leading parts (where polarizing electrode were not laminated on the current collector) were 1 cm×5 cm, as shown in FIG. 3.

[Manufacturing Electric Double Layer Capacitor]

Figure 4:
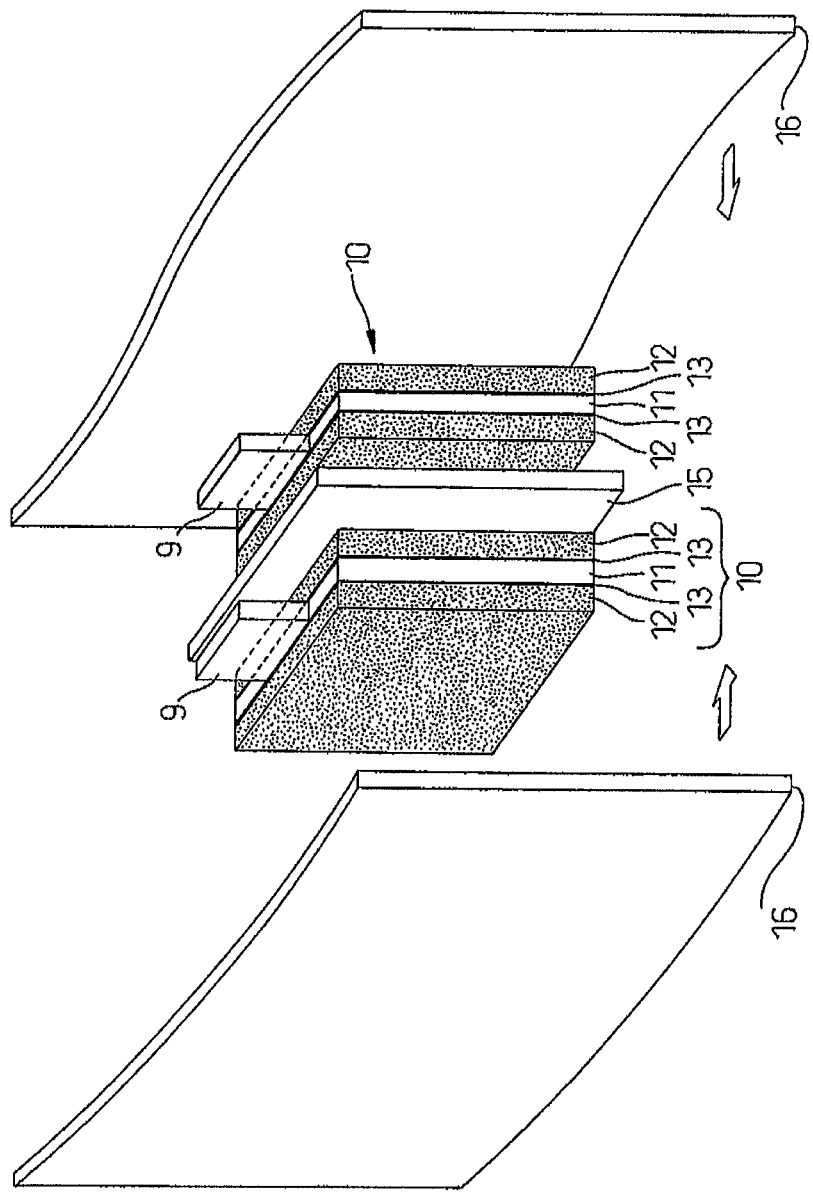
FIG. 4 is a schematic perspective view showing a configuration of a combination of electrode materials of the invention with a separator.

An aluminum pack cell was fabricated by inserting one hydrophilized porous PTFE sheet with a thickness of 80 μm and 3.5 cm square (by W. L. Gore & Associates, Inc. "BSP0708070-2") as a separator, into between a positive polarizing electrode and a negative polarizing electrode, and then covering the electrodes and the separator with two aluminum laminated materials (5 cm×10 cm) (by Showa Denko Packaging Co., Ltd. "PET12/A120/PET12/CPP30 Dry laminated film"), and then heat sealing the three sides including leading parts. An electric double layer capacitor before heat sealed is shown in FIG. 4. A part of leading parts was led to outside of the aluminum pack cell so that connections between the leading parts and the aluminum laminated materials were sealed by heat sealing. After drying the aluminum pack cell in vacuum for 24 hours at the temperature of 150° C., inserted the cell into a glove box whose dew point was held under −60° C. in the argon atmosphere, and injected 4 mL of propylene carbonate solution (1.5 mol/L TEMA/PC) of triethylmethylammonium tetrafluoroborate (1.5 mol/L) as electrolyte solution into the upper opening surface (that was not sealed surface) of the cell, and then leave the cell to stand under a reducing pressure of −0.05 MPa to substitute electrolyte solution for gas contained inside of the electrodes. After that, a single laminated electric double layer capacitor was formed by sealing the opening of the aluminum pack cell. The electric double layer capacitor was preserved 24 hours at the temperature of 40° C., the electrolyte solution was induced inside of the electrode for aging. And then, the capacitor was held between SUS (Special Use Stainless steel) boards (with a thickness of 5 mm, 5 cm×5 cm), and pressurized both sides of the capacitor in pressure 1 MPa.

Evaluation tests were performed about the electric double layer capacitor of the above described examples and comparative examples.

<Durability Test>

The formed electric double layer capacitor was operated under 2.7 V or higher. Its electrostatic capacitance and internal resistance were measured at the time of stating operation, and after operating approximately 1,000 hours, and compared the obtained values to evaluate how much capacitance was sustained, and how much internal resistance was raised.

Detailed measured items are below.

[Density of Electrostatic Capacitance]

The above mentioned electric double layer capacitor was continuously charged and discharged 10 cycles (one cycle was charging 1,500 seconds under conditions of 10 mA/cm$^2$, 3.0 V, and discharging until reaching 0 V under conditions of 10 mA/cm$^2$), and then the discharge curve from the start of discharging at the 10th cycle to 0 V was integrated to determine the electrostatic capacitance of the electric double layer capacitor during the 10th cycle of charging, the obtained value was divided by the electrode volume to calculate the density of the electrostatic capacitance.

[Direct Current Internal Resistance]

Measuring the density of electrostatic capacitance, the direct current internal resistance was calculated by a formula "V=IR".

[Sustaining Rate of Electrostatic Capacitance]

The above mentioned electric double layer was operated with repeating cycles one of which is comprised of float charging for 100 hours under conditions of 10 mA/cm$^2$, 3.0 V, at a temperature of 60° C. or 70° C., and then discharging under a condition of 10 mA/cm$^2$ until reaching 0V. Electrostatic capacitances were measured after the 1st cycle and a designated time (1,000 hours) were passed, by above described method about density thereof. And the results of the sustaining rates of the electrostatic capacitance were evaluated by the sustaining rate of the electrostatic capacitance after the designated time was passed against at the start of measuring (i.e., at the 1st cycle) [100×(electrostatic capacitance after the designated time was passed)/electrostatic capacitance at the 1st cycle] (%).

[Raising Rate of Internal Resistance]

Measuring the sustaining rate of electrostatic capacitance, direct internal resistance was also measured to evaluate raising rate of internal resistance by a formula of (internal resistance after the designated time was passed)/(initial internal resistance)×100.

The results are shown in TABLE 1.

TABLE 1

| | | | | SBR (COMPARATIVE EXAMPLE) | | PNVA | | PNVA COPOLYMER | |
|---|---|---|---|---|---|---|---|---|---|
| SOLVENT | CURRENT COLLECTOR | VOLTAGE | TEMPERATURE | SUSTAINING RATE OF CAPACITANCE [%] | RAISISNG RATE OF RESISTANCE [%] | SUSTAINING RATE OF CAPACITANCE [%] | RAISISNG RATE OF RESISTANCE [%] | SUSTAINING RATE OF CAPACITANCE [%] | RAISISNG RATE OF RESISTANCE [%] |
| PC | PLAIN | 3.0 V | 70° C. | 85 | 200 | 84 | 160 | 85 | 125 |
| | | | 60° C. | 89 | 150 | 91 | 135 | 90 | 118 |

According to TABLE 1, the fact was found that in the case of PNVA was used, the raising rate of internal resistance was smaller and its durability was higher even under high voltage of 3.0 V, comparing to using SBR. Above all of PNVA, the fact was found that in the case of PNVA copolymer was used, the raising rate of internal resistance was further smaller and its durability was further higher even under high voltage of 3.0 V.

<Immersion and Detachment Tests for Electrolyte Solution>
(Heat-resistant Test)

The above mentioned electrodes were formed by changing adhesive component in conductive adhesive (PNVA, PNVA copolymer (polymerization ratio 9/1), SBR). These electrodes were immersed in a simulated electrolyte solution i.e., propylene carbonate solution (1.5 mol/L TEMA/PC) of triethylmethylammonium tetrafluoroborate (1.5 mol/L) at the temperature of 100° C., and then the state of detachment thereof was observed after the designated times (1, 5, 10 and 24 hours) were passed.

The results are shown in TABLE 2.

TABLE 2

Immersion and detachment tests for electrolyte solution
(1.5M TEMA/PC, 100° C., PLAIN ALUMINUM FOIL)

| | PNVA | PNVA COPOLYMER | SBR (COMPARISON) |
|---|---|---|---|
| 1 HOUR | ◯ | ◯ | X |
| 5 HOURS | Δ | ◯ | — |
| 10 HOURS | X | ◯ | — |
| 24 HOURS | — | ◯ | — |

* ◯: No detachment  Δ: Easily detached by scraping  X: Completely detached

According to TABLE 2, the fact was found that in the case of PNVA was used as adhesive component in conductive adhesive, detachment was inhibited, i.e., the adhesiveness was increased, comparing to using SBR. Above all, the fact was found that in the case of using PNVA copolymer, the adhesiveness was remarkably increased.

For PNVA copolymer comprising high adhesiveness, electrodes were formed by changing their polymerization ratio, and then detachment tests of these electrodes were conducted. Polymerization ratios of PNVA against sodium acrylate were 9/1, 7/3, or 5/5. Moreover, the temperature of simulated electrolyte solution was 200° C., for accelerating detachment. The results are shown in TABLE 3.

TABLE 3

<Immersion and detachment tests for electrolyte solution>
(1.5M TEMA/PC, 200° C., PLAIN ALUMINUM FOIL)

|        | 9/1 | 7/3 | 5/5 |
|--------|-----|-----|-----|
| 5 min  | ◯   | ◯   | ◯   |
| 15 min | Δ   | ◯   | ◯   |
| 60 min | X   | X   | ◯   |

* ◯: No detachment Δ: Easily detached by scraping X: Completely detached

According to TABLE 3, it was found that the more the content of sodium acrylate was increased, the more the detachment was inhibited, i.e., the adhesiveness was increased.

For conductive adhesive using these copolymers, their viscosities were measured. The following results were obtained.

Their Viscosities were measured by using BL viscometer at the temperature of 25° C. and the rotational speed or motor (30 rpm).

9/1: 12,000 mPa·s
7/3: 20,000 mPa·s or more
5/5: 20,000 mPa·s or more
(PNVA only: 9,000 mP·s)

From an aspect of manufacturing electrodes, polymerization ratio comprising suitable dispersibility and coating properties are preferable. By considering both adhesiveness and processability, proper polymerization ratio may be selected.

<Durability Affected by the Position Containing Tungsten Oxide>

Figure 5:
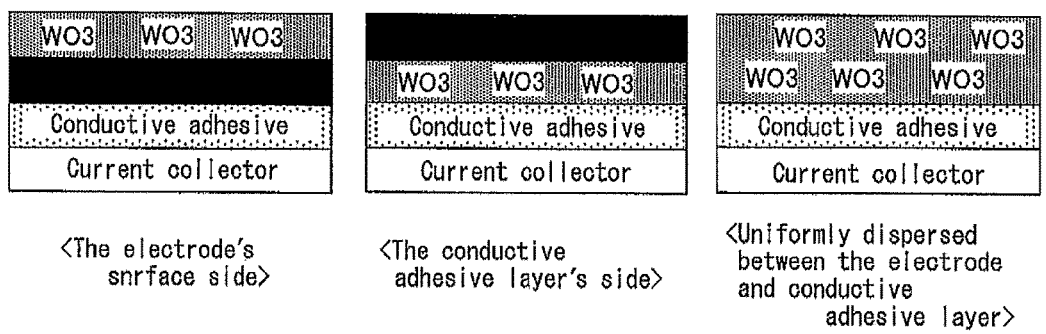
FIG. 5 is a schematic view showing a structure of three types of electrodes, wherein the positions of tungsten oxide are changed.

Three types of electrodes, whose positions containing tungsten oxide were different, such as <the electrode's surface side>, <the conductive adhesive layer's side> and <uniformly dispersed between the electrode and conductive adhesive layer>, were prepared based on the above mentioned electrodes, as shown in FIG. 5. Electrode named as <the electrode's surface side>was prepared where tungsten oxide was existed in the electrode's surface side by putting activated carbon sheet between conductive adhesive and electrode materials containing tungsten oxide, so that the position of tungsten oxide was kept away from a current collector. Electrode named as <the conductive adhesive layer's side>was prepared where tungsten oxide was existed in the conductive adhesive's side (instead of in the electrode's surface side) by overlaying electrode material containing tungsten oxide on the surface of the conductive adhesive and then activated carbon thereon, so that the position of tungsten oxide was kept close to the current collector. Both the thickness of activated carbon and electrode material used in the electrodes named <the electrode's surface side> and <the conductive adhesive layer's side> were 100 μm, and density of tungsten oxide contained in the electrode material was 10 parts by weight (respect to 100 parts by weight of the sum of electrode material). Electrode named <uniformly dispersed between the electrode and conductive adhesive layer> was prepared where tungsten oxide contained in electrode material was uniformly dispersed into activated carbon sheet used in the electrodes named <the electrode's surface side> and <the conductive adhesive layer's side>. Thereby, the thickness of electrodes, used amount of tungsten oxide were arranged to be the same in the three types of electrodes. To define how much the positions of tungsten oxide affected durability of capacitor, SBR binder was used as the adhesive component in the conductive adhesive.

Above mentioned durability evaluation was tested on these three types of electrodes. Conditions of operating capacitor were under 3.0 V, 70° C., 1,000 hours, and propylene carbonate solution (1.5 mol/L TEMA/PC) of triethylmethylammonium tetrafluoroborate (1.5 mol/L) as electrolyte solution was used. The results are shown in TABLE 4.

TABLE 4

Affection of durability due to the positions of tungsten oxide (W03)
(3.0 V, 70° C., 1,000 HOURS, 1.5M TEMA/PC)

| CONTAINED POSITION OF WO3 | SUSTAINING RATE OF CAPACITANCE [%] | RAISING RATE OF RESISTANCE [%] |
|---|---|---|
| ELECTRODE's side | 80 | 450 |
| CONDUCTIVE ADHESIVE LAYER's side | 80 | 700 |
| UNIFORMLY DISPERSED | 85 | 200 |

According to TABLE 4, the fact was found that the more tungsten oxide was closer to a current collector, the less effect of increasing durability became, and in particularly, the raising rate of resistance was increased. In the case of using electrode named <uniformly dispersed between the electrode and conductive adhesive>, the effectiveness of increasing durability was the highest, compared to other types of electrodes.

9 Terminal of current collector
10 Electrode for electric double layer capacitor
11 Current collector
12 Polarizing electrode layer
12a Pore
13 Conductive adhesive layer
15 Separator
16 Aluminum laminated material

What is claimed is:

1. An electrode for an electric double layer capacitor, comprising:
   a polarizing electrode layer including porous carbon particles, an auxiliary conducting agent, a tungsten oxide powder, and a binder;
   a conductive adhesive layer including a conductive material and a poly-N-vinylacetamide (PNVA)-based binder; and
   a sheet current collector, wherein the conductive adhesive layer is disposed between the polarizing electrode layer and the sheet current collector,
   wherein particles of the tungsten oxide powder are dispersed uniformly within the polarizing electrode layer between an outer surface of the electrode and a surface of the conductive adhesive layer adjacent to the polarizing electrode layer, wherein the particles of the tungsten oxide powder are dispersed in an activated carbon sheet of the polarized electrode layer away from the sheet current collector.

2. The electrode for an electric double layer capacitor according to claim 1, wherein the polarizing electrode layer, the conductive adhesive layer and the sheet current collector are laminated in this order.

3. The electrode for an electric double layer capacitor according to claim 1, wherein the poly-N-vinylacetamide (PNVA)-based binder is selected from the group consisting of an N-vinylacetamide homopolymer and an N-vinylacetamide copolymer.

4. The electrode for an electric double layer capacitor according to claim 3, wherein the N-vinylacetamide copolymer is a copolymer of a poly-N-vinylacetamide and sodium acrylate.

5. The electrode for an electric double layer capacitor according to claim 4, wherein the polymerization ratio of the poly-N-vinylacetamide and sodium acrylate is 9/1 to 5/5.

6. The electrode for an electric double layer capacitor according to claim 1, wherein the conductive material contains a carbon black.

7. The electrode for an electric double layer capacitor according to claim 1, wherein the sheet current collector contains a plain aluminum foil.

8. The electrode for an electric double layer capacitor according to claim 1, wherein an average size of the particles of the tungsten oxide powder is from 0.1 µm to 50 µm.

9. The electrode for an electric double layer capacitor according to claim 1, wherein the polarizing electrode layer and the sheet current collector remain bonded under a voltage of more than 3.0 V.

10. The electrode for an electric double layer capacitor according to claim 1, wherein a mass of the tungsten oxide powder is from 2 parts by mass to 40 parts by mass with respect to a total mass of the porous carbon particles, the auxiliary conducting agent, and the binder as 100 parts by mass.

11. The electrode for an electric double layer capacitor according to claim 1, wherein the polarizing electrode layer has a porosity in a range of 40% to 90% and/or an average pore size of 0.1 µm to 5 µm.

* * * * *